Nov. 10, 1959  C. JOHNSON  2,912,007
PILOT OPERATED FOUR-WAY VALVE
Filed April 15, 1953  3 Sheets-Sheet 1
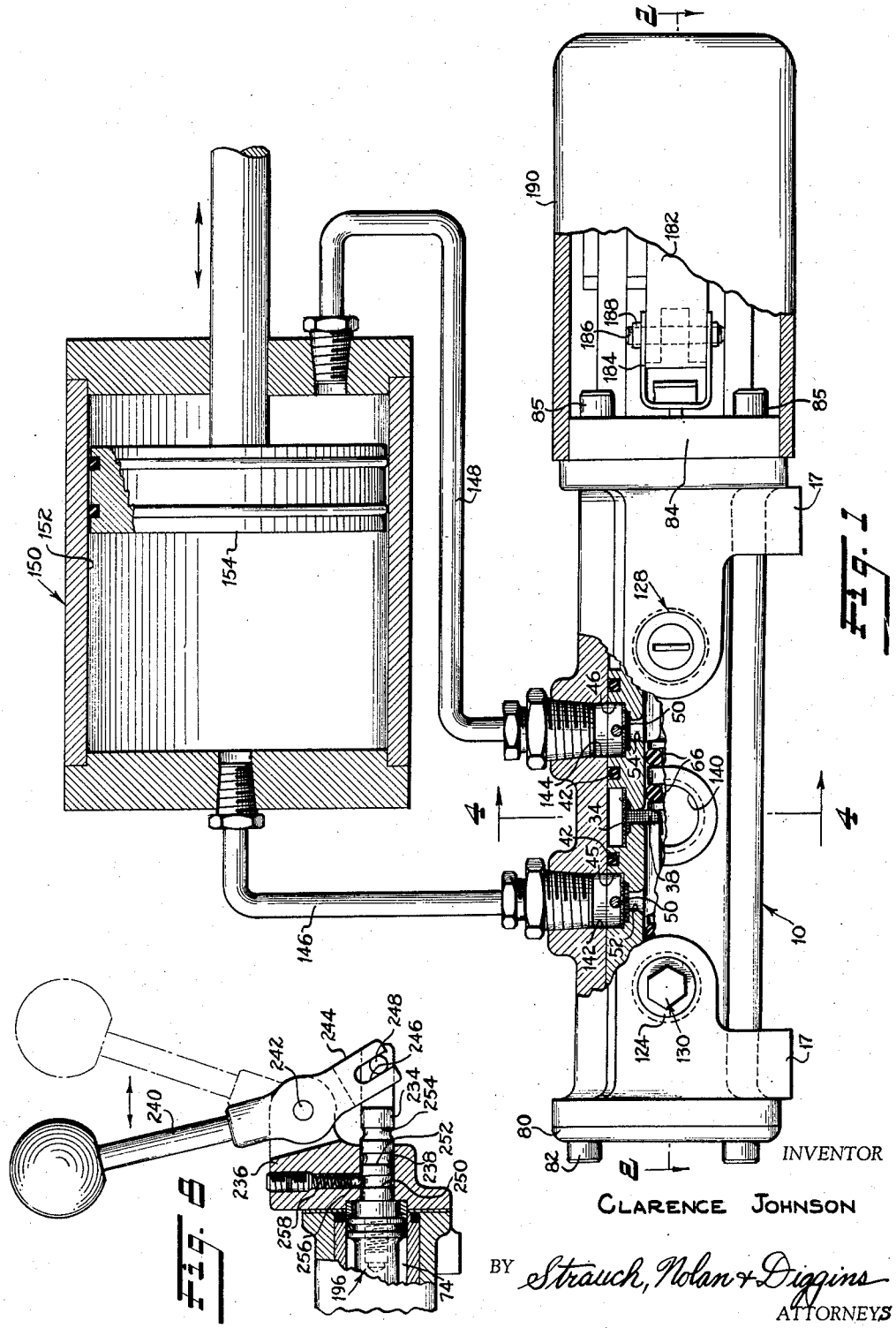
INVENTOR
CLARENCE JOHNSON
BY Strauch, Nolan & Diggins
ATTORNEYS Nov. 10, 1959    C. JOHNSON    2,912,007
PILOT OPERATED FOUR-WAY VALVE
Filed April 15, 1953    3 Sheets-Sheet 2
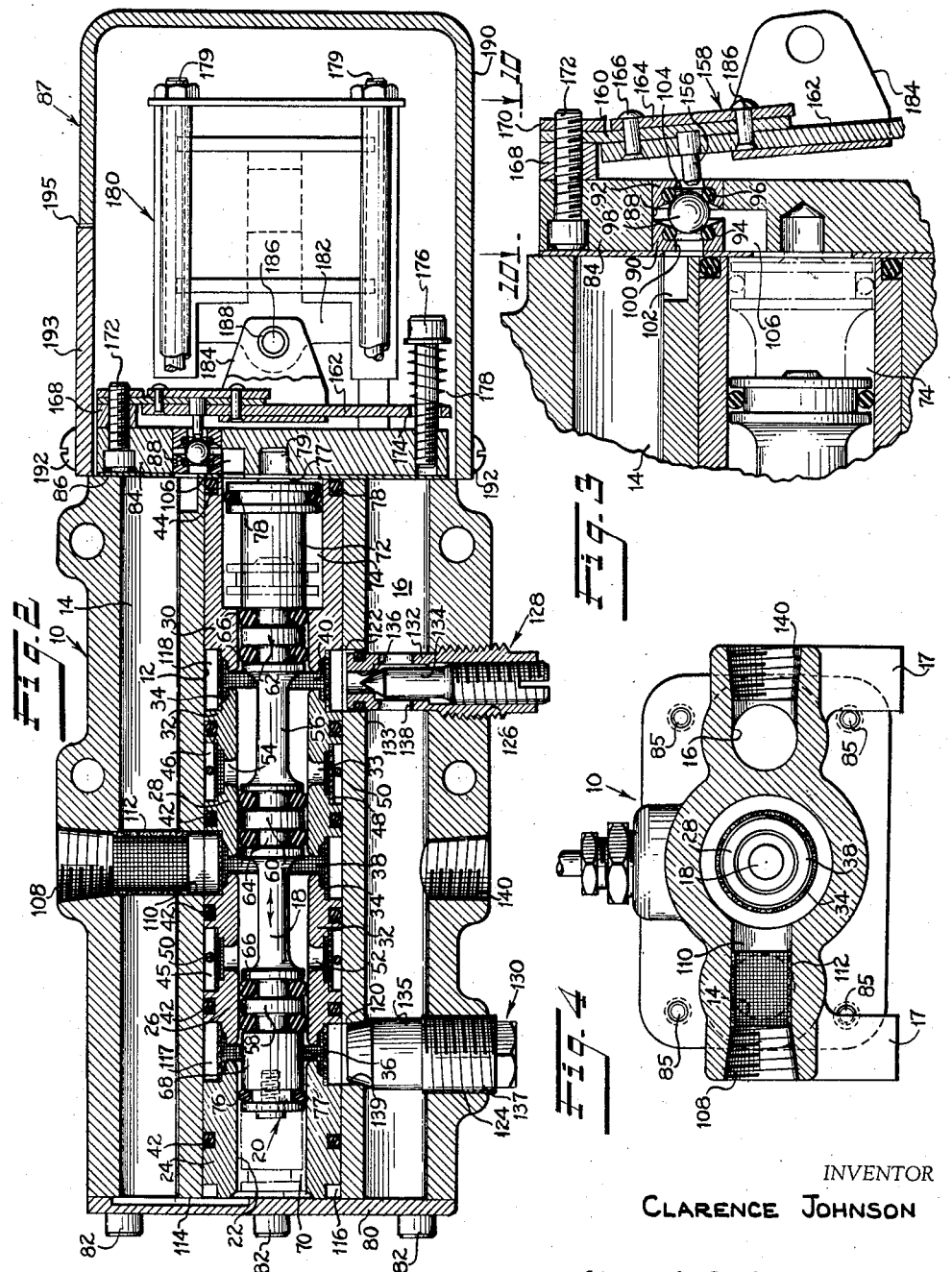
INVENTOR
CLARENCE JOHNSON
BY *Strauch, Nolan + Diggins*
ATTORNEYS

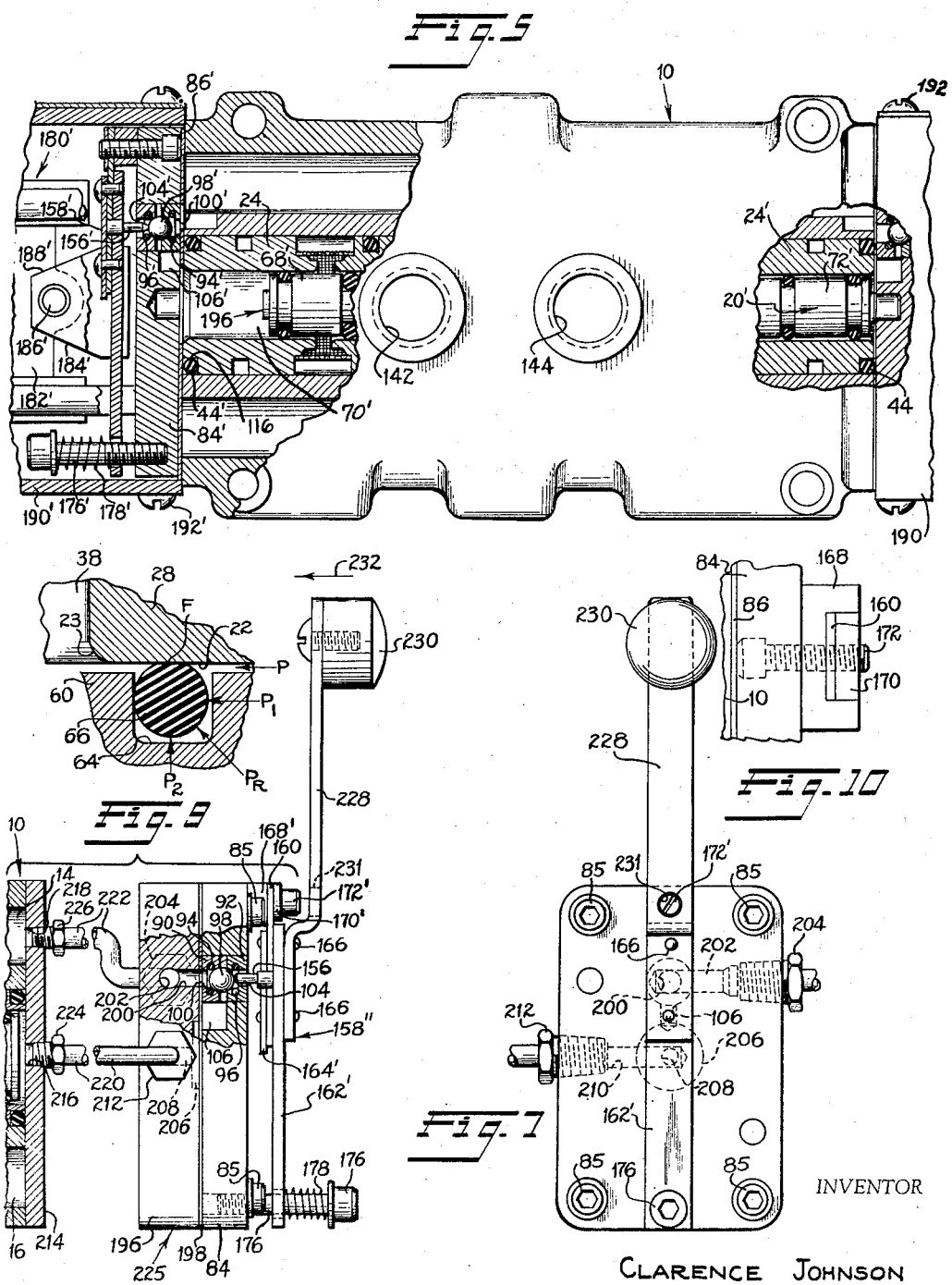

United States Patent Office 2,912,007
Patented Nov. 10, 1959

2,912,007

PILOT OPERATED FOUR-WAY VALVE

Clarence Johnson, South Euclid, Ohio

Application April 15, 1953, Serial No. 348,942

7 Claims. (Cl. 137—622)

The present invention relates to valves and more particularly to solenoid-controlled pilot-operated valves adaptable for use in conjunction with fluid motors, as in servo-motor systems.

A large percentage of modern industrial production equipment is automatic or semi-automatic in operation and requires the application of forces susceptible of delicate control as to direction, duration, etc. As a result, much of such equipment embodies servo-motor systems wherein a valve controls the supply and exhaust of hydraulic or pneumatic pressure to a fluid motor, for example, a piston and cylinder for performing useful work. A further development has been the use of a solenoid to operate the control valve either directly or through the intermediary of a pilot valve.

The solenoid-controlled valves, then, perform the overall function of converting electrical impulses to mechanical movement of a valve which, in turn controls the supply of oil or air, under pressure, to a servo-motor. Since modern production machines are, in many instances an assembly of smaller machines and mechanisms interlocked and synchronized electrically to control the generation of large forces, no system is more reliable than its solenoid operated control valves. If one valve becomes inoperative for one reason or another, the element it controls will fail to function causing malfunctioning of the entire machine with concomitant wrecking of tools and spoiling of work.

The most important difficulties encountered in present day solenoid valves are their tendencies to fall apart, to stick, and, in sticking, to burn out the solenoid. In regard to falling apart, the constant hammering and shock effect of the solenoid causes pins, screws and nuts to crystallize, fracture, or loosen and fall out.

Solenoid valves may be classified as direct acting and pilot operated. In the former, the solenoid is kinematically linked directly to the control valve stem and, therefore, must be large and powerful enough to overcome a return spring and the friction of the valve and also must have a stroke equal to the length of travel of the valve stem. Solenoids adapted for this type of service, then are large, powerful, and expensive, the large size and high power increasing the shock effect and tendency toward destruction of the valve operated thereby and requiring a heavy current and unnecessarily heavy relays merely to overcome the initial resistance to movement.

In the case of pilot-operated solenoid valves, the solenoid actuates a small pilot valve which, in turn, controls the main valve. This reduces the size of the solenoid required but the packing customarily used on conventional sliding pilot valves soon acquires gummy surfaces causing the pilot valves to stick.

The foregoing difficulties are compounded by the fact that the main valve is usually spring-returned, causing the valve stem to cock and, because of the well-known characteristics of springs, the return force is not uniform, being at a maximum when the spring is fully compressed and a minimum when fully extended.

An additional shortcoming of prior art solenoid valves is that many are designed to require extremely close tolerances in their construction thus rendering them, not only more difficult and expensive to manufacture, but also more vulnerable to misuse encountered in general industrial applications.

The present invention contemplates valves, particularly but not exclusively adapted to operation by pilot valves and especially but again, not exclusively, by pilot valves which are solenoid actuated. More specifically, the invention comprises a main valve which may be fluid actuated in both directions and controlled by a double-acting ball-type pilot valve, preferably operated by a solenoid although, as the description proceeds it will be seen that other means of operating the pilot may be availed of.

Accordingly, it is an important object of the present invention to provide novel valves which will not stick or fall apart in normal service, have a long useful life, low cost, and are easily serviced.

It is a further object of the invention to provide improved valves using replaceable seals of soft resilient material thereby eliminating close fits and tolerances, which seals are so constructed that they will not "blow out" or become dislodged from their installed positions when subjected to high fluid pressure.

It is a further object of the invention to provide novel valves which incorporate dual purpose screens serving both as structural elements and as screens or filters.

It is a still further object of the invention to provide novel valves having a flow control element which is fluid operated in both directions and, therefore, will not cant or cock.

Another object of the invention is to provide improved valves embodying pilot valves operating between resilient seats and having a very short travel.

Still another object of the invention is to provide novel valves controlled by a solenoid-actuated pilot but which are adaptable to be actuated by direct mechanical linkage or by mechanically operated pilot valves.

Another object of the invention is to provide novel valves which are so constructed as to be easily convertible to various types of operation, including direct manual control and near or remote, solenoid or manually actuated pilot valve control, such conversion being accomplished quickly and easily by the mere rearrangement and/or substitution of a small number of parts.

Still another object of this invention is to provide a solenoid assembly of novel construction adapted for use in solenoid operation of valves or other uses where such solenoid operators may be desired.

A still further object of the invention is to provide novel valves which generally overcome the difficulties encountered in comparable prior art valves.

These and other objects and advantages of the invention will be apparent to those conversant with the art from a reading of the following description and subjoined claims in conjunction with the annexed adrawings, in which:

Figure 1 is an elevational view of one embodiment of the valve of the invention, partly in section and shown installed in a diagrammetrically illustrated servo-motor system;

Figure 2 is a longitudinal sectional view of the valve taken on line 2—2 of Figure 1;

Figure 3 is a fragmentary enlargement of a portion of Figure 2 showing the details of the pilot valve;

Figure 4 is a sectional view taken on line 4—4 of Figure 1;

Figure 5 is a side elevational view, partly in section, of a modified form of the invention;

Figure 6 is a side elevation, partly in section, of a manual form of pilot valve operator;

Figure 7 is an elevational view of the manual pilot valve operator shown in Figure 6;

Figure 8 is a side elevation, partly in section, of a direct-manual control lever assembly for use on the valve in lieu of the other operating means disclosed;

Figure 9 is a fragmental view showing certain details of Figure 2 on an enlarged scale; and Figure 10 is a fragmental top plan view taken on line 10—10 of Figure 3.

Referring to the drawings and, particularly, Figures 1 and 2, reference numeral 10 indicates generally a valve body or housing, usually of cast construction, containing a centrally located bore 12. The housing 10 also contains an inlet chamber or manifold 14 and an exhaust chamber or manifold 16 which may take the form of coplanar bores flanking and parallel to the main bore 12. Suitable support feet 17 are preferably provided to support the valve body where it is to receive external support.

The main or flow control valve indicated generally at 18 (Figure 2) is comprised of a control element 20, axially slidably disposed in a segmented guide bore indicated generally at 22. The guide bore 22 is defined by a number of substantially cylindrical liner elements 24, 26, 28 and 30, coaxially arranged in main bore 12. The ends of the liner elements are of reduced diameter to form annular extensions 32, adjacent extensions being received in and spaced by cylindrical spaced screws 34 to define annular ports 36, 38 and 40 between respective adjacent liners. The extensions 32 are formed with radii 33 adjacent ports 36, 38 and 40 to permit O-rings 66 to pass smoothly thereover as will be seen from the operation of the device to be later described (see Figure 9). The liner elements are a free fit in bore 12 and are externally grooved to accommodate suitable packing such as O-rings 42 and 44. The O-rings 42 and 44 eliminate the need for close tolerance fits between the liner elements and the bore 12, allow a certain degree of resilience in the positioning of the individual liner elements to compensate for slight misalignment and provide an effective seal against the leakage of operating fluids between the liners and the bore 12, O-ring 44 has the additional functions of sealing the right hand end of bore 12 and permitting greater latitude in respect to the necessary tolerances to which the lengths of the liner elements must be held.

Intermediate, liner elements 26 and 28, identical and interchangeable, are formed with annular grooves 45 and 46 accommodating screen cylinders 48 held in position by means of retainer rings 50. A plurality of radial ports 52 place the interior of liner element 26 in communication with groove 45; similarly a plurality of radial ports 54 place the interior of liner element 28 in communication with groove 46.

Control element 20 consists of an elongated stem 56 formed with axially spaced lands 58, 60 and 62 freely received within guide bore 22 and adapted in an intermediate position of the control element, to cover ports 36, 38 and 40, respectively. The transition section of control element 20 between stem 56 and each of the lands 58, 60 and 62, as clearly shown in Figure 2, is filleted and provides in conjunction with the curved ends of extensions 32 forming ports 36, 38 and 40 and the rounded inner corner of ports 52 and 54 a smooth fluid flow path for the operating fluid to reduce to a minimum sharp corners producing eddy currents interfering with optimum fluid flow. Annular grooves 64 at the ends of each land are provided with free-floating O-rings 66 (relieved about .015) which serve to seal the respective ports when covered by the lands. As will be noted from Figure 1, substantial clearance remains between the land and the guide bore 22 so that port sealing is effected by the O-rings 66 rather than the associated lands which do not contact the bore 22 and function principally to maintain the proper spacing between the pairs of O-rings.

Referring now to Figure 9, the particular relation between O-rings 66, grooves 64 and the inner surface of the guide bore 22 will be explained. The outer diameter of the O-ring is greater (preferably by 5 to 8%) than the diameter of the guide bore 22 and the width and depth of the groove 64 approximately 10% greater than the cross sectional diameter of the O-ring. As a result, fluid pressure P enters the clearance space on the high pressure side of the O-ring and the bottom of the groove acting to force the O-ring laterally against the opposite side of the groove and radially outwardly against the guide bore as indicated by arrows $P_1$ and $P_2$, respectively. Thus, an effective seal is achieved between the annular contact surfaces of the guide bore and the low pressure side of the groove.

As indicated by the flat portion F, the cross-section of the O-ring is only slightly compressed, in direct proportion to pressure $P_2$ and the only other force available to create friction between the O-ring and the bore is that slight force exerted by the bore on the O-ring, due to the fact that the outer diameter of the ring is larger than that of the bore, tending to compress the ring circumferentially toward the bottom of the groove.

In this manner an effective sliding packing is created having a minimum of frictional resistance and utilizing the very pressure sealed against to increase the sealing pressure and, therefore, the effectiveness of the packing is proportionately increased as required by higher pressures, an important improvement over prior structures wherein the O-ring fills the groove and sealing is achieved entirely by the constant compression of the cross-section of the O-ring by mechanical cooperation of the bore and the bottom of groove.

Still referring to Figure 9, it will be seen that the diagonal resultant $P_R$ of forces $P_1$ and $P_2$ tends to urge the O-ring out of the groove and as the control element 20 (moving to the left) carries the O-ring toward radius 33 of port 38, preparatory to crossing the port, the restraining influence of the guide bore is progressively relieved and, under high fluid pressures P, the O-ring starts to distend circumferentially. Under such conditions and if such distention is of appreciable magnitude, the O-ring is liable to be "blown out" of the groove entirely or be sheared off by the land when it crosses the radius at the opposite side of the port 38. In order to prevent such an occurrence without resort to relocation of the O-rings in the guide bore effecting a seal on the control element 20 solely due to the inherent contracting force of the O-ring itself or O-rings having an excessive hardness, which would, therefore, wear faster, a special O-ring configuration has been devised in which the ratio of the outer diameter to the cross-sectional diameter is approximately 4 to 1. With such proportions, it is possible to use O-rings of material having a Durometer hardness factor as low as 65, taking advantage of the better wearing qualities thereof without the risk of blowing out or severing the O-rings and at the same time providing a more effective seal, particularly when operating fluids of higher pressures are to be used.

The end of control element 20 adjacent land 58 is provided with an additional land 68 which functions and will hereinafter be referred to as a piston. Piston 68 operates in a cylindrical chamber 70 defined by liner 24. At the opposite end from piston 68, control element 20 is formed with a piston 72 having a substantially greater working area than piston 68 and operating in a cylindrical chamber 74 defined by liner element 30.

Pistons 68 and 72 are provided with O-rings 76 and 78 respectively adjacent the extreme ends of control element 20, which O-rings are a squeeze fit in the respective chambers 70 and 74. A squeeze of .005 inch has been found satisfactory for most applications but a somewhat tight or looser fit may be used. Thus, the control element 20 is supported entirely by the end O-rings 76 and 78 allowing free floating movement of control element 20 in bore 22. Such an arrangement affords maximum service life to the intermediate O-rings. To differentiate between O-rings 66 on one hand and O-rings 76 and 78 on the other, the former may be considered as sealing rings while the latter are supporting or bearing rings as well as seals. Furthermore, the use of O-rings compensates for misalignment and/or eccentricities and eliminates the use of close fits and manufacturing tolerances.

The piston faces at the extreme ends of control element 20 are provided with hardened steel inserts 77 adapted to abut similar inserts or buttons 79 on the end closures of the housing to reduce wear caused by the repeated contact between said ends and end closures.

A cover plate 80 fastened to the left hand end of the housing 10 as by screws 82, closes the adjacent ends of bore 22 and chambers 14 and 16. A mounting plate 84 is fastened to the opposite end of the housing 20 as by cap screws 85 (Figure 1), a suitable gasket 86 being provided between the mating surfaces.

As best shown in Figure 3, mounting plate 84 forms the base of a solenoid assembly unit 87 of general utility. Plate 84 is apertured as at 88 to receive, with a press fit, a pilot valve control or contactor structure as may be desired. As illustrated a pair of spaced, oppositely disposed annular inserts 90, 92 are press fitted into aperture 88. The opposing surfaces of the inserts are grooved to accommodate and retain resilient seating rings such as O-rings 94, 96. A spherical pilot valve 98, preferably a stainless steel ball, is disposed for double-acting operation between seat rings 94, 96.

Annular insert 90 defines a port 100 communicating with chamber 14 through a slot or groove 102 in the sidewall thereof while insert 92 defines a port 104 in communication with the exterior of the valve housing 10. The space between inserts 90, 92 is in communication with cylinder chamber 74 through a slot or groove 106 in plate 84.

Referring again to Figure 2, housing 10 is provided with an inlet port 108, adapted to be connected to a source of fluid under pressure, which port communicates with chamber 14. Although port 108 may be located at any point on the housing so long as it opens into chamber 14, it is preferably located substantially midway between the ends of chamber 14, directly opposite and in coaxial alignment with a port 110 connecting the chamber with the interior of bore 22 through annular port 38.

In order to exclude foreign particles from chamber 14, a screen cylinder 112 is provided between ports 108 and 110. Thus the fluid entering chamber 14 must pass through screen 112 while fluid entering port 110 must pass through screen 34.

The left hand end of chamber 14 is placed in communication with cylinder chamber 70 by means of a relieved portion 114 on the inside face of cover plate 80. The pressure of fluid in chamber 14, therefore, has access to the working face or head of piston 68 and also enters an annular groove 116 on the left end of terminal liner element 24. The pressure in groove 116 exerts a force on liner element 24, urging it to the right, which force is transmitted through all the liner elements and screens to maintain them in position and to squeeze O-ring 44 to perfect the sealing function thereof. In event this pressure force is not desired, as in non-pilot operation, it is merely necessary to assemble cover plate 80 to dispose groove 114 in communication with exhaust manifold 16.

The adjacent ends of liner elements 24 and 26, with their respective reduced extensions 32 define an annular groove 117; a similar groove 118 is defined between liner elements 28 and 30. Apertures 120 and 122 are provided in the side wall of exhaust manifold 16 in alignment with grooves 117 and 118, respectively. In the opposite walls of the manifold 16, threaded openings 124 and 126 are provided in coaxial alignment with apertures 120 and 122 for the installation of flow control or metering valves 128 and 130, where desired.

Two flow control valves, each of different construction, have been shown in this exemplary embodiment of the invention for ease of illustration but it will be understood that the control valves would ordinarily be identical. It is also to be understood that only one metering valve may be used where only unidirectional control of the rate of speed of the associated servo-motor is desired or the flow control valves may be omitted entirely if a constant speed operation of the servo-motor in both directions is satisfactory for the particular installation.

Metering valve 128 consists of a body sleeve 132 having an exteriorly threaded portion adapted to be received by threaded opening 126 and a tubular portion extending into aperture 122. An O-ring 133 forms a fluid-tight seal between the aperture 122 and the associated tubular portion of the sleeve 132.

The sleeve 132 is internally bored and threaded to receive an adjustable needle 134 for varying the flow area of a port 136 in the inner end of the tubular portion of the sleeve. Lateral ports 138 place the interior of the sleeve 132 in communication with the exhaust manifold 16.

The metering valve 130 is simpler and has a greater flow capacity comprising a plug 135 having a threaded portion 137 disposed in aperture 124 and a tapered end 139 extending into port 120. The tapered end 139 and port 120 coact to define an annular orifice the area of which may be varied by threading plug 130 in and out in aperture 124.

A threaded exhaust port 140 communicates the interior of manifold 16 with the atmosphere either directly or through a conduit not shown threadedly secured to the port.

As best shown in Figure 1, the housing 10 contains a pair of threaded ports 142 and 144 communicating with grooves 45 and 46 respectively and adapted to be connected by means of conduits 146 and 148 to a servo-motor such as that shown diagrammatically at 150. The servo-motor 150 may comprise, for example, a cylinder 152 and a double acting piston 154 disposed therein for reciprocating movement.

Referring to Figures 2 and 3, the pilot valve 98 is actuated in one direction, i.e., pushed from seat 96 to seat 94 by means of a pin 156 carried by a novel, hinged operating lever indicated generally at 158.

The lever assembly 158 makes use of a hinge 160 made of a strip of tough, flexible material such as "Teflon," "Saran," or rubber-impregnated fabric having one end clampingly secured between strips 162 and 164 of rigid material as by means of rivets 166 and the other end clamped between a fulcrum block 168 and a plate 170 as by a cap screw 172. "Teflon" due to its resistance to heat, impregnation by fluids of all kinds and structural deterioration due to age is the preferred material for hinge 160.

In order to insure that screw 172 cannot possibly work loose under high frequency operating conditions, it is inserted from the inner surface of the plate 84 and the head is countersunk flush with said surface. As shown in Figure 10, fulcrum block 168 is formed with a channel which receives the upper end of flexible strip 160 and a square nut 170. The hinge mounting elements 160, 168, 170 and 172 are assembled on plate 84 before it is secured to the housing 10 and when the plate is in position on the housing the screw head abuts the adjacent portion of the housing through gasket 86. Thus, since rotation of nut 170 is precluded by the channel in fulcrum block 168, and screw 172 cannot "back off" because its head abuts the housing, no amount of vibration will materially loosen the screw.

As most clearly appears in Figure 3, the adjacent ends of clamping members 164 and 170 are only slightly spaced and the joint therebetween is overlapped by clamping element 162 in such a way that the flexible strip 160 in compression and not shear. The joint can flex in only one plane and, therefore, acts as a guide but without the trouble inherent in guide rods, etc. Since the pilot valve travels only a short distance (from 1/64 to 1/32 inch in most applications) the angular motion of the lever is very small and the flexible material is practically frictionless and non-fatiguing. This combination of factors results in a hinge which will last indefinitely without wearing, sticking or working loose.

Referring again to Figure 2, the free end of clamping strip 162 is apertured as at 174 freely to receive the shank of a cap screw 176 threaded into plate 84. A coil spring 178 compressed between the head of screw 176 and strip 162, resiliently biases lever 158 toward the plate 84 so that pin 156 forces ball 98 against seat 94. The force of spring 178 is adjustable by means of screw 176.

The position of lever 158 is controlled, in this embodiment, by a solenoid, indicated schematically at 180, mounted on plate 84 through studs 179 and having plunger 182 which moves to the right i.e., away from plate 84 when the solenoid armature is electrically energized. The solenoid plunger is kinematically linked to the lever 158 by means of a free floating stirrup 184 (see Figure 1). A pin 186 extending through the stirrup and plunger pivotally connects the two and is retained in position by O-rings 188 located in suitable grooves at the ends of the pin.

A cover 190, detachably secured to the plate 84 by screw fasteners 192, completely encloses the solenoid, pilot valve and lever assemblies to protect them against damage and is provided with a removable inspection plate 193. Clearance 195 between the edges of plate 193 and cover 190 permits the escape of exhaust air discharged within the cover.

The ratio of travel of the solenoid plunger to the travel of the pilot ball valve, in the disclosed embodiment is approximately 3 to 1 and since the valve travel is between 1/16 and 1/32 inch, the maximum required stroke of the solenoid plunger is somewhat less than 1/8 inch although the solenoid should be capable of a slightly longer stroke to cope with normal manufacturing tolerances, etc. At any rate, this is very light service for the usual industrial solenoid and conducive to long life. Further, in this regard, it will be appreciated that a solenoid sufficiently powerful to actuate the control element 20 directly would draw 13 to 15 times more current (amperage) than that disclosed herein to operate the pilot valve.

The operation of this first embodiment of the invention is as follows:

Operating fluid under suitable pressure enters manifold 14 from inlet port 108. With the solenoid de-energized spring 178, acting through lever 158 and pin 156 forces pilot ball valve 98 against seat 94 closing port 100. The pressure fluid in manifold 14, in this position of pilot ball valve 98, passes through recess 114 to chamber 70 forcing control element 20 to the right limit position shown in full lines, Figure 2. Any air in chamber 74 is expelled by piston 72 through slot 106 and port 104 to the interior of cover 190 and then to the atmosphere.

With the control element in such position, fluid in manifold 14 also flows through port 38 into the space defined by lands 58, 60 and liner element 26, through ports 52, groove 45, port 142 and conduit 146 to the left hand side of cylinder 152 forcing the piston 154 to the right. Meanwhile, the fluid in the right hand side of the cylinder is expelled through conduit 148, port 144, ports 54, the space between lands 60 and 62, port 40, groove 118, and through metering port 136 of needle valve 128 into the exhaust manifold 16 and out of port 140 to the atmosphere. Adjustment of the metering valve 128, controls the rate at which fluid can escape from the right hand side of cylinder 152 and therefore regulates the speed of piston 154 to the right.

When the solenoid 180 is energized, the plunger 182 moves lever 158 to the right overcoming the force of spring 178 and removing pin 156 from against ball 98. The fluid pressure in manifold 14, acting through passage 102 and port 100 forces ball 98 to the right against seat 96, closing exhaust port 104 and allowing the fluid under pressure to pass through slot 106 to chamber 74. At this junction, fluid under equal pressure is acting in opposite directions on pistons 68 and 72 but, due to the greater area of the piston 72, the control element is shuttled to the left as shown in broken lines, Figure 2. In this position, the operating fluid in chamber 14, passes through port 38, between lands 60 and 62, through ports 54, groove 46, port 144 and conduit 148, to the right hand side of cylinder 152, forcing piston 154 to the left and expelling air from the left end of cylinder through conduit 146, port 142, groove 45, ports 52, between lands 58 and 60, through port 36, groove 117, and needle valve 130 to the exhaust manifold 16 and through exhaust port 140 to the atmosphere. The rate of speed of piston 154 to the right and to the left is independently controlled by needle valves 128 and 130, respectively.

It will be noted that the O-rings 66 on the left and right hand end of lands 58 and 62, respectively, while useful as additional safety seals, may be omitted to simplify construction without interfering in any way with the functioning of the valve.

In this, as well as all other solenoid operated embodiments hereinafter disclosed, in the event of a power failure, cover 190 may be removed and the lever assembly operated manually.

A modified form of the invention is shown in Figure 5 wherein the differential piston operation of the control element 20 of the first described embodiment is supplanted by the use of two solenoid-operated pilot valves. In describing the embodiment of Figure 5, elements in common with the first embodiment will be designated by like reference numerals whereas duplicate structure will be indicated by reference numerals bearing a prime mark.

In this modification, the cylinder liner element 30 (Figure 2) is replaced by a liner element 24' which is the exact duplicate of liner element 24 at the opposite (left hand) end of bore 12. Closure plate 80, Figure 2, is replaced by mounting plate 84' and an O-ring 44' is located in annular groove 116 of liner element 24 in place of O-ring 42 previously used in element 24. Closure plate 84' is the exact duplicate of corresponding plate 84 and mounts a pilot valve and solenoid assembly identical with that described in conjunction with the first embodiment.

The control element 196 differs from control element 20 only in that the former is symmetrical about its transverse axis, i.e., the piston portions 68' and 72' at each end have the same pressure responsive areas. While the form of control element 196 has equal piston areas, which construction gives each pilot valve and associated solenoid an equal amount of control, it is to be understood that a differential piston type of control element such as 20 may also be employed where it is desired that one solenoid (the one corresponding to the larger piston area end of the control element) be the master control. It is to be noted that, with the exception of the control elements, no different parts are required in this modification and therefore a manufacturer can easily produce either type of valve alternatively or concurrently without altering the production processes except for the change in control elements and in the assembly of the finished unit. Likewise, a consumer can easily convert from one type of valve to the other, for example, from the first to the second embodiment by purchasing an additional liner element 24 and pilot valve and solenoid assembly, and the modified form 196 of control element 20. This construction is particularly advantageous to manufacturers and suppliers who would thereby eliminate the need for large inventories of different types of valves or conversion and replacement parts for the different types of valves.

The operation of the modified form of valve is as follows:

The opposite solenoids would, in installation, be connected to electrical or electro-mechanical circuits (not shown) capable of effecting alternate energization of the respective solenoid armatures, so that when solenoid 180' is energized, solenoid 180 would be deenergized and vice versa with solenoid 180' energized, plunger 182' would move to the left, moving with it lever assembly 158', thus overcoming the biasing pressure of spring 178' exerted on ball 98' by pin 156'. The pressure of fluid in chamber 14 forces ball 98' against seat 96' closing port 104' and opening port 100' allowing the fluid to pass through slot 106' into chamber 70' and thus moving control element 196 to the extreme right hand limit position shown in Figure 5. The flow path of working fluid through various valve ports is the same as has been described for equivalent positions of the control element in the first embodiment and will not be repeated. At the same time solenoid 180 being deenergized, spring 178 forces lever assembly 158 to the left until pin 156 engages ball 98 moving it from seat 96 to seat 94 thereby closing port 100 and opening exhaust port 104. Therefore fluid in chamber 74, ahead of piston 78 as it moves to the right, is forced out through slot 106, past valve 98 and through port 104 to the atmosphere. The operation is exactly reversed when the circuit controlling the solenoids energizes 180 and deenergizes 180'.

The ball pilot valve assembly described hereinabove has particular advantages when actuated by a solenoid, for example: reduction in the size of solenoid normally used; elimination of the need for heavy relays and reduction of the current required to the point where the operating current used for low current carrying switches such as "Micro" switches is sufficient to operate the valve; reduction in the required stroke of the solenoid; and minimizing of the danger of overloading and burning out the solenoid armature due to sticking of the pilot.

However, the pilot valve arrangement may also be adapted with great advantage to manual operation in which form it is characterized by long, reliable, trouble-free service and great sensitivity of control. Such a modification is illustrated in Figures 6 and 7. Referring first to Figure 6 a mounting plate 84 containing inserts 90, 92, valve seats 94, 96, ball valve 98, notch 106 and in all respects identical to mounting plates 84 and 84' employed in the preceding embodiments, is secured as by cap screws 85 to a base plate 196, suitable gasket means 198 being provided therebetween. Plate 196 is provided with a bore 200 in coaxial alignment with port 100 of insert 90 and connecting with a passage 202 which extends to one edge of plate 96 where it is enlarged and suitably tapped to receive a fitting 204. The mating surface of plate 196 is further provided with a shallow recess or depression 206 which is in at least partial registration with notch 106 in the mating surface of plate 84 as best shown in Figure 6. A short bore 208 in the bottom of recess 206 connects with a passage 210 extending to the edge of plate 196 where it is suitably enlarged and tapped to receive fitting 212. An adapter plate 214 is secured to the end by housing 10 as by cap screws (not shown) but preferably of similar size, thread and location as screws 85 shown in Figures 2 and 7 to secure mounting plates 84. Adapter plate 214 is provided with a pair of bores 216 and 218 in flow communication with chambers 74 and 14 respectively. Conduits 220 and 222 are connected at one end to bores 216 and 218 by suitable fittings 224 and 226 respectively and at their opposite ends to passages 202 and 210 as by fittings 204 and 212 respectively. Conduits 220 and 222 may be comprised of copper tubing or the like or may be flexible in character and in either case may be of any desired length. The use of such conduits makes it possible to locate the finger tip control assembly indicated generally at 225, at a convenient distance from the valve, which is particularly advantageous where valves are installed in difficult locations which would render it awkward to manipulate a control mounted directly on the valve body, or where space is limited. In this embodiment ball valve 98 is operated by a finger tip control comprising a lever assembly 158" which is in all respects identical to lever assemblies 158 and 158' described hereinabove with minor exceptions, as follows: (1) the relative position of clamping members 162' and 164' is reversed and an operating lever 228 carrying control knob 230 is secured to member 162' by rivets 166; (2) since manual operation would not raise problems of loosening the hinge mounting screw 172 (Figures 2, 3 and 5) encountered in high frequency solenoid operation, the hinge mounting resorted to in the embodiments using solenoids is unnecessary and accordingly, a simple cubiform fulcrum block 168', a square washer 170', and a screw 172' threaded into plate 84 are used to mount the lever hinge assembly, an aperture 231 being provided in the lever arm 228 to accommodate the insertion of a screw driver or like tool to engage the head of the screw.

In operation, very light hand or finger pressure on knob 230 in the direction of arrow 232 has the same effect as energizing the solenoids employed in the first and second embodiments, that is, the lever will pivot on hinge 160 in a counterclockwise direction compressing spring 178 and withdrawing pin 156 so that fluid pressure in chamber 14 may pass through port 218, conduits 222, 202, 200, port 100, past ball valve 98, through notch 106, depression 206, conduits 208, 210, 220 and bore 216 into chamber 74. The finger tip pilot valve operator is employed with a valve of the type disclosed in Figure 2 wherein control element 20 carries differential pistons and a constant fluid pressure acts on the smaller piston 68' to return the element to its original (in this case, right bore) position. Thus, the fluid pressure supplied to chamber 74 acts on the larger area of piston 72 moving the control element to the left hand limit position and maintains it in such position until the knob 230 is released whereupon spring 178 will pivot lever assembly 158' in a clockwise direction. Pin 156 pushes valve 98 against seat 94 thereby closing off the supply of fluid from chamber 14 and placing chamber 74 in communication with the atmosphere through port 104 and allowing the constant return pressure in chamber 70 to shuttle control element 20 back to its original position.

It will be understood that, in the event that valve housing 10 is installed in an accessible position and location, base plate 196 and adaptor plate 214 along with conduits 220 and 222 may be eliminated and mounting plate 84 secured directly on the housing 10. To permit such alternative usage, the mounting bolts 85 and the apertures in plates 84, 196, 214 and housing 10 receiving same are uniformly located. It will further be understood that remote positioning of the pilot valve assembly may be availed of with solenoid as well as manual operation of the pilot. For example, in cases where valve housing 10 must be installed in a location where space limitations would make it impossible to mount the solenoid assembly 180 or 180' directly on the housing, an adapter plate 214 with associated conduits 220 and 222 may be secured to the housing and the conduits run to a location providing sufficient room for the solenoid unit and there connected to a base plate 196 carrying mounting plate 84. The manual lever assembly 158' may be dismounted by the simple removal of screws 172 and 176 and replaced by a lever assembly 158. The solenoid assembly 180 may then be mounted and secured on plate 84 in the manner described in the preceding embodiments.

A fourth modification of the invention is shown in Figure 8 which illustrates the manner in which the same basic valve disclosed in the preceding embodiment may be constructed or for converted direct manual actuation of a control element of the type shown at 196, Figure 5, in lieu of the pilot valve controlled pneumatic operation already described. For such direct manual operation, the hardened insert 77 in one end of control element 196' is replaced by a coaxial extension 234 suitably secured to the control element. A mounting bracket 236 having a bore 238 adapted to slidably receive extension 234 is mounted on one end of housing 10, in place of plate 84 and secured thereto by cap screws 85 not shown in Figure 8 but similar in nature and location to those shown in Figures 1 and 7.

A manual control lever 240 is pivotally mounted at 242 on bracket 236 and carries a bifurcated extension, one leg of which appears at 244 in Figure 8. Both legs of the bifurcated extension have open-ended slots such as 246 which slidably receives the projecting ends of a transverse pin 248 on extension 234.

Pivotal movement of the lever between the extreme alternate positions shown in solid and broken lines in Figure 8, slides the control element between the limit positions to control the valve ports in the same manner as fully described herein above.

The extension 234 is preferably formed with spaced annular detent grooves 250, 252 and 254 adapted to receive a ball detent 256 resiliently biased thereinto by spring 258. The end grooves 250 and 254 in cooperation with detent 256, serve to define and releasably lock the control element in its limit positions while middle groove 252 performs the same function with respect to an intermediate position of the control element. Referring to Figures 1 and 2 it will be seen that, in such intermediate position lands 58, 60 and 62 are disposed across ports 36, 38 and 40, respectively which ports are effectively sealed off by O-rings 66 thus locking piston 154 in any desired intermediate position.

All forms of the valve of this invention are adapted for servicing without removal from the line. To this end, removal of either end plate exposes the interior sleeves and control element for bodily removal to replace O-rings and perform other service operations that may be required as a result of use.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flow control valve comprising a housing having interior walls defining a bore therein, a plurality of fluid inlet and outlet ports in said walls, a plurality of annular liner elements coaxially disposed in said bore, cylindrical screens in said bore interposed between said liner elements and maintaining said liner elements in axially spaced relation to define screened annular ports between adjacent ends thereof respectively in communication with said inlet and outlet ports, a control element coaxially disposed in said liner elements and operable selectively to place selected ones of said annular ports in communication with one another, resilient seal rings at each end of said control element having a squeeze fit in associated liner elements sealingly to support said control element for free-floating movement coaxially of said bore and means operable to move said control element.

2. A flow control valve comprising a housing, a plurality of annular liner elements coaxially disposed in said housing and defining a segmented guide bore therein, said liner elements having juxtaposed ends of reduced diameter, cylindrical screen elements telescopingly receiving said ends and spacing said liners to define screened annular ports therebetween, a plurality of ports in said housing communicating with the interior of said guide bore through respective annular ports and the exterior of said housing, packing rings resiliently supporting and sealing said liners in said housing, a control element coaxially disposed in said guide bore, resilient packing rings on said control element providing bearing means slidably supporting said control element for axial movement in said guide bore selectively to establish and interrupt communication between selected ones of said annular ports, and means operable to move said control element.

3. In a flow control valve comprising a housing having interior walls defining a bore therein, inlet and exhaust chambers in said housing adjacent to and respectively communicating with said bore, means adapted to connect said inlet chamber with a source of fluid under pressure and means communicating said exhaust chamber with the exterior of said housing, valving means comprising a plurality of annular liner elements coaxially disposed in said bore to define a segmented guide bore therein and having adjacent ends of reduced diameter, cylindrical screens telescopingly receiving said ends and spacing said liner elements to define annular ports therebetween in communication with said guide bore and respectively in communication with said inlet and exhaust chambers, port means in the walls of said guide bore and communicating with the exterior of said housing, conduit means exposing the extreme end face of at least one terminal liner element to the pressure in said inlet chamber whereby said pressure assists in maintaining said liner elements and screens in mutual abutting relation, a control element having resilient bearing means at each end thereof supporting said control element in said guide bore for axial displacement therein, spaced lands on said control element adapted upon axial displacement selectively to vary the path of communication between said port means and annular ports, and means for selectively displacing said control element.

4. A unitary solenoid assembly adapted for selective use as either a pilot valve controller or a contact controller comprising a base plate adapted to support a controller unit and having an aperture in spaced relation to said controller unit to receive a mounting screw for an operating lever; a mounting screw in said aperture with its end protruding from one face of said plate; a fulcrum block surrounding the protruding portion of said mounting screw; a hinge strip of insulating material of a tough, flexible nature having one end carried on said protruding portion of said mounting screw with one face in surface contact with said fulcrum block; a clamp plate non-rotatably associated with said fulcrum block and threadedly secured to said mounting screw and having surface contact with said other face of said hinge strip end to clampingly secure said hinge strip to said fulcrum block; rigid support strips secured in face contact with the extending portion of said hinge strip, at least one of said rigid support strips extending well beyond the other free end of said hinge strip and being apertured to receive a limit screw to establish a normal position of said hinge strip with respect to said controller unit; solenoid mounting studs mounted in said base plate and disposed in spaced relation to the opposite lateral edges of said hinge strip; a solenoid assembly supported by said studs in spaced relation to said hinge strip and having a movable plunger; stirrup means pivotally connected to said solenoid plunger and receiving the midportion of said one rigid support strip therein; a limit screw assembly mounted on said base plate and cooperating with said one rigid support strip to resiliently maintain the hinge strip in its normal position to dispose said solenoid plunger in one of its extreme positions; and means carried by said hinge strip in position to actuate said controller unit whereby upon energization of said solenoid said controller unit, through movement of said solenoid plunger and hinge and rigid support strips to their other extreme position, will be suitably operated.

5. A flow control valve comprising a housing having interior walls defining a bore therein, a plurality of fluid ports spaced along said walls, a plurality of annular open ended, sleeve-like liner elements coaxially disposed in said bore, fluid sealing means between said liner elements and said bore, screen-like cylindrical spacing elements interposed between said liner elements and maintaining said liner elements in axially spaced relation to define respective annular ports freely communicating with the open adjacent ends thereof, a slidable control element coaxially disposed in said liner elements in peripheral free clearance relation to the internal bores of said liner elements and operable on selective axial displacement to place selected fluid ports in free communication with one another through said annular ports, resilient seal rings at each end of said control element dimensioned in cross-section to be squeeze fitted between said control element and associated liner elements to sealingly support said control element for free-floating axial movement, and means operable to move said control element to various selected positions.

6. A flow control valve comprising a housing having interior walls defining a through bore therein, a plurality of fluid inlet and outlet ports in said interior walls having their inner ends intersecting said through bore, an inlet chamber paralleling and axially coextensive with said through bore and intersecting said inlet port; a plurality of annular liner elements coaxially disposed in said through bore; cylindrical screens in said through bore interposed between said liner elements and maintaining said liner elements in axially spaced relation to define screened annular ports between adjacent ends of said liners respectively in communication with said inlet and outlet ports; a control element coaxially disposed in said liner elements and having sealing lands of uniform diameter spaced axially therealong to define annular passages operable to selectively place selected ones of said annular ports in communication with one another and having a maximum diameter at one end such that the opposite end faces are of differing diameters and provide pressure responsive surfaces of differing area at the opposite ends of said control member; resilient seal rings at each end of said control element having a squeeze fit in associated end liner elements operative to sealingly support said control element for free-floating movement in said liners coaxially of said through bore and sealing rings in said lands sealingly cooperating with said liners; and means operable to move said control element comprising housing end plates fixed to said housing and closing the opposite ends of said through bore and said inlet chamber, one of said end plates having a passage adapted to expose said smaller diameter control member end face to the fluid pressure in said inlet chamber at all times and the other of said end plates having passage means therein to alternately expose the larger diameter control member end face to atmospheric pressure and to the fluid pressure in said inlet chamber, said passage means including intersecting branch passages one of which communicates at one end with the inlet chamber and a second of which communicates at one end with said larger diameter control member end face and selectively operable pilot valve means interposed between said respective branch passages to alternately close said one branch passage and simultaneously vent said second branch passage to atmospheric pressure and to open said one branch passage and connect it to said second branch passage to effect opposite axial movement of said control member.

7. The control valve of claim 6 wherein said other end plate mounts a solenoid mechanism having a movable armature, a lever pivoted at one end adjacent said pilot valve means and having a protrusion near said one end extending into said one branch passage to operatively engage said pilot valve means, spring means acting on the other end of said lever to normally bias said lever and its protrusion to a position maintaining said pilot valve means in venting position and a link interconnecting said lever and the armature of said solenoid whereby upon energization of said solenoid said armature, link and lever will be moved to release said pilot valve means for movement to its fluid bypassing position.

References Cited in the file of this patent

UNITED STATES PATENTS

| | | |
|---|---|---|
| 128,762 | Smith | July 9, 1872 |
| 307,516 | Anson | Nov. 4, 1884 |
| 746,337 | Junggren | Dec. 8, 1903 |
| 1,173,157 | Allen | Feb. 29, 1916 |
| 1,319,006 | Kimball | Oct. 14, 1919 |
| 1,988,545 | Donn | Jan. 22, 1935 |
| 2,015,055 | Adams | Sept. 24, 1935 |
| 2,088,174 | Paullin | July 27, 1937 |
| 2,143,204 | McCormack | Jan. 10, 1939 |
| 2,160,117 | Borresen | May 30, 1939 |
| 2,209,418 | Overbeke | July 30, 1940 |
| 2,327,210 | Overbeke et al. | Aug. 17, 1943 |
| 2,396,643 | Ganahl | Mar. 19, 1946 |
| 2,409,517 | Schmit | Oct. 15, 1946 |
| 2,456,084 | Ray | Dec. 14, 1948 |
| 2,471,285 | Rice | May 24, 1949 |
| 2,506,129 | Ashton | May 2, 1950 |
| 2,516,159 | Stropp | July 25, 1950 |
| 2,524,142 | Seeloff | Oct. 3, 1950 |
| 2,545,118 | St. Clair | Mar. 13, 1951 |
| 2,598,907 | Griffin | June 3, 1952 |
| 2,605,079 | Miller | July 29, 1952 |
| 2,614,539 | Ernst | Oct. 21, 1952 |
| 2,616,512 | Coon | Nov. 4, 1952 |
| 2,624,585 | Churchill et al. | Jan. 6, 1953 |
| 2,661,182 | Kipp | Dec. 1, 1953 |
| 2,699,756 | Miller | Jan. 18, 1955 |
| 2,700,986 | Gunn | Feb. 1, 1955 |
| 2,717,978 | De Fligue | Sept. 13, 1955 |
| 2,732,860 | Ray | Jan. 31, 1956 |
| 2,735,445 | Ray | Feb. 21, 1956 |
| 2,735,968 | Bogue et al. | Feb. 21, 1956 |
| 2,743,897 | Elliott | May 1, 1956 |